April 26, 1960  D. R. PAXTON  2,934,617
EMERGENCY SHUT-OFF VALVE
Filed Aug. 21, 1958  2 Sheets-Sheet 1

INVENTOR.
DOUGLAS R. PAXTON
BY Elliott & Pastoriza
ATTORNEYS

April 26, 1960

D. R. PAXTON 2,934,617

EMERGENCY SHUT-OFF VALVE

Filed Aug. 21, 1958

INVENTOR.
DOUGLAS R. PAXTON
BY Elliott & Pastoriza
ATTORNEYS

United States Patent Office 2,934,617
Patented Apr. 26, 1960

2,934,617

EMERGENCY SHUT-OFF VALVE

Douglas R. Paxton, Ventura, Calif., assignor of one-half to Donald L. Bennett, Ventura, Calif.

Application August 21, 1958, Serial No. 756,394

4 Claims. (Cl. 200—61.86)

This invention relates generally to safety valves and more particularly to an improved valve for automatically shutting off flow of fluids through one or more conduits in response to certain emergency situations.

It is a primary object of the invention to provide an improved emergency shut-off valve for use with residential hot water heaters, automatic washers, dishwashers, and other similar equipments storing or using liquids. The valve is designed to respond to water leakage or excessive pressure and to prevent the possible consequent damage to the equipment involved as well as prevent possible flooding of the adjacent areas.

More particularly, it is an object to provide an improved automatic valve for equipments storing or using liquids capable of simultaneously shutting off one or two fluid passages communicating with the particular equipment in the event of either excessive water line pressure or a flooding condition as a result of leaking of water from the equipment or connecting pipes.

Another important object is to provide a safety valve of the above type which may be conveniently employed to throw a light switch or break an electrical connection in the event of an emergency such as excessive water pressure in the line or flooding to thus provide a visual indication of the emergency or disconnect electrical lines to the equipment.

Still another object is to provide a safety valve for use with equipments storing or using liquids in which the valve may be installed against a closet wall in a relatively flush manner so as to expose through suitable openings in the wall only the operating controls of the valve, whereby a clean, functional appearance results and yet all controls are readily accessible.

For purposes of illustration, the description of the shut-off valve of the present invention will be primarily identified from the standpoint of its application to hot water heaters, although it will be appreciated that the valve is equally adaptable to other equivalent installations heretofore mentioned, and as subsequently described.

Briefly, the above-mentioned and many other objects and advantages of the present invention are attained by providing a valve housing arranged to be interposed between the water and gas conduits passing to the hot water tank and heater respectively. The valve housing itself defines a cylinder having lateral ports passing therethrough to which the conduits are connected. Within the cylinder there is in turn provided a movable piston having transverse bores arranged to register with the ports when in a first position so that both water and gas can flow through the complete valve housing in an uninterrupted manner. When the piston is moved to a second position, however, the transverse bores therein are moved out of registration with the lateral ports with the result that the lateral ports are eclipsed and both water and gas flow are simultaneously cut off.

Normally, the piston is biased in a direction tending to move it from its first position to its second position and a suitable holding means is provided for retaining the piston in its first position. This holding means is responsive to an emergency situation such as an excessive increase in the water line pressure or a flooding of the area resulting, for example, from a leak in the water tank. In addition to the holding means there may be provided a simple re-set or cocking lever movable with the piston for re-setting the mechanism after the emergency situation has been corrected. This re-cocking lever may also include a connecting link to a signal light switch so that movement of the piston from the first to the second position will not only effect closing of the water and gas conduits but will simultaneously throw the signal light switch to provide a visual indication of the emergency condition. Re-setting of the piston by this cocking lever will then also serve to turn the signal light off.

A better understanding of the preferred embodiment of the invention will be had by referring to the accompanying drawings in which.

Figure 1:
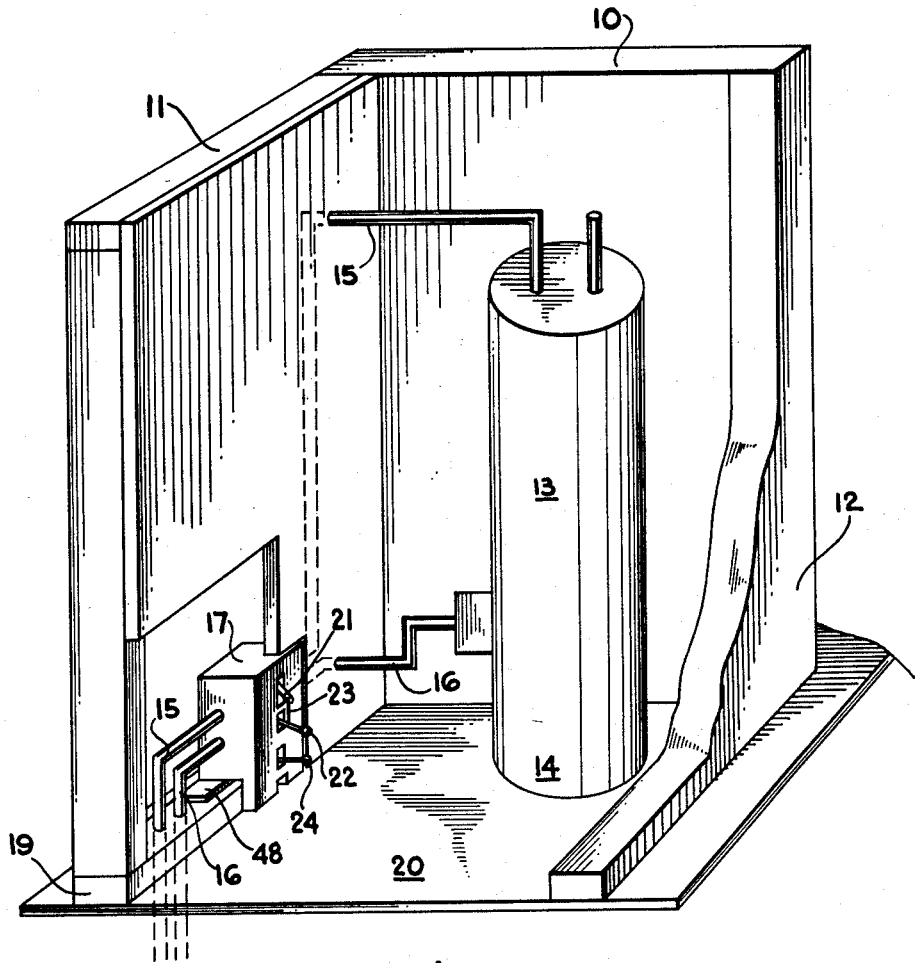
Figure 1 is a broken away perspective view of a closet including a water tank, heater, and the emergency shut-off valve of the present invention.

Referring first to Figure 1, there is shown a closet structure including a sidewall 10, rear wall 11, and front wall 12, the other side wall and portions of the front wall being broken away to expose the interior of the closet. Within the closet there is positioned a conventional hot water tank 13 including the usual gas heater section 14. Conventionally, water is piped into the tank through an inlet conduit 15 and gas supplied to the heater through an inlet conduit 16. As shown in Figure 1, these inlet pipes may pass within the sidewall 11 from an exterior source.

The emergency shut-off valve of the present invention comprises a valve housing 17 interposed in the conduits 15 and 16. The valve is designed simultaneously to shut off the flow of water through the conduit 15 and gas through the conduit 16 in response to either one or both of the following emergency conditions: first, an excessive increase in the water pressure supplied through the conduit 15, and second, a flooding of the area as may occur by the tank bursting or possible leaks in the various water piping. For this latter condition, there is provided an actuating rod 18 shown in Figures 2 and 3 extending from the lower end of the valve housing 17 and connecting to a responsive means positioned adjacent the plate 19 on the floor area 20 of the closet.

Also included in the structure of the valve housing 17 is a signal light switch 21 coupled to a re-set or cocking lever 22 as by a connecting link 23. A triggering lever 24 responsive to actuation of the connecting rod 18 is also provided. In the preferred embodiment, the various levers 22 and 24 and the toggle type signal slight switch 21 are arranged to be mounted flush to the inside of the front wall 12 and to project through suitable openings in the front wall for easy access as best shown in Figure 1. By this arrangement, the valve housing 17 itself as well as the actuating rod 18 is enclosed and out of sight so that a relatively neat appearance is provided.

Figure 2:
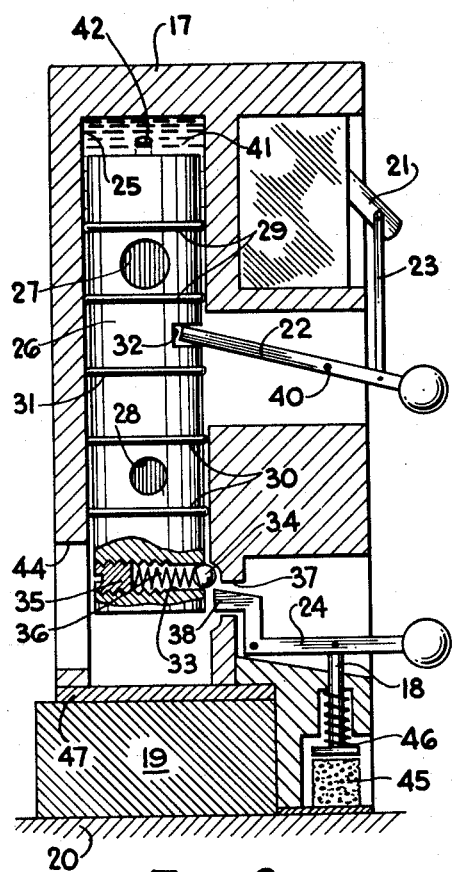
Figure 2 is an enlarged view partly in cross section of the shut-off valve itself with the operating portion of the valve in a first position; and, Figure 3 is a view similar to Figure 2, showing operating portions of the valve in a second position.
Figure 3:
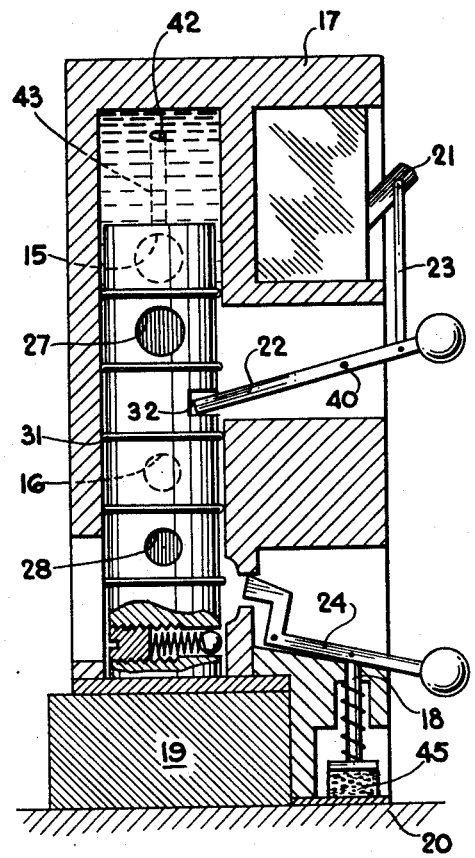

Referring now to Figures 2 and 3, the actual valve mechanism and its operation will be described in detail. In Figure 2, it will be noted that the valve housing 17 defines within its interior a cylinder 25. A piston member 26 having a pair of transverse bores 27 and 28 is arranged for back and forth longitudinal movement within the cylinder 25. The side wall of the cylinder 25 itself includes lateral ports for connection to the water and gas conduits 15 and 16 as indicated by the dotted lines in Figure 3. When the piston 26 is in a first position as illustrated in Figure 2, these lateral ports are in registration with the transverse bores 27 and 28 so that both water and gas may flow through the valve housing structure 17.

Preferably suitable pairs of O-ring seals as indicated at 29 and 30 are disposed on either side of the transverse bores 27 and 28, respectively. An additional seal 31 is provided between the lower and upper seals of the pairs 29 and 30, respectively. The position of these annular seals is such that when the piston 26 moves to the second position illustrated in Figure 3, the lateral inlet ports connected to the conduits 15 and 16 will be sealed off from the central portion of the valve housing 17 so that no water or gas can inadvertently escape from the valve housing in the vicinity of the lever 22.

The piston 26 also includes at its central portion a small cavity 32 arranged to receive one end of the re-setting or cocking lever 22 as shown. The lower end of the piston, on the other hand, is provided with a transverse opening 33 containing a small ball 34 at one end and a set screw 35 at the other end. A biasing spring 36 is disposed between the screw 35 and ball 34 as shown to urge the ball 34 outwardly from the piston member. The ball 34, however, is prevented from passing entirely out from the opening in the piston 26 by a small stop 37 forming part of the cylinder side wall. Also co-operating with the stop 37 is one end 38 of the triggering lever 24 which serves to engage an under portion of the ball 34 when in the position shown in Figure 2.

The lever 24 is pivoted at 39 to the housing structure and has its other end portion coupled to the actuating rod 18. Similarly, the re-setting or cocking lever 22 is pivoted at 40 intermediate its ends to the housing structure 17.

Above the piston 26 within the cylinder 25 there is left a space 41 in communication with the inlet water conduit 15 through a small port 42 forming the end of a branch passage indicated by dotted lines 43 in Figure 3. Water, therefore, fills the region 41 and thus the top of the piston 26 is always subject to the water pressure in the line.

The housing 17 may be provided with a rear access opening 44 permitting access to the threaded screw 35 so that the biasing force exerted by the spring 36 on the ball 34 may be adjusted by threading in or out of this screw. As will become clearer when the operation of the system is described, this adjustment is important insofar as adjusting the entire valve structure to operate in response to excessive water pressure exerted on top of the piston 26 by water within the region 41 of the cylinder.

With respect to the responsive means to flooding of water on the floor area 20, there is provided within the structure 19 at the lower end of the actuating rod 18, a material which changes its physical characteristics in the presence of water. In the particular embodiment chosen for illustrative purposes, this material constitutes a sponge 45 and serves as a supporting member for the actuating rod 18. Absorption of water on the floor area 20 by the sponge 45 thus destroys its supporting abilities to the end that the rod 18 moves downwardly under the weight of the triggering lever 24 and/or in response to the biasing force of spring 46. Alternatively, other materials which lose their structural characteristics in response to the presence of water such as a sugar cube, for example, could be substituted for the sponge 45.

In order to facilitate mounting and enable construction of the valve with a minimum number of parts, the cylinder 25 may be closed at its lower end with member 47 which includes integral ears 48 for attachment to plate 19.

The complete operation of the emergency shut-off valve will now be described. Referring to Figure 2, the piston 26 for normal operation is positioned as shown so that the transverse bores 27 and 28 register with the lateral ports to which the conduits 15 and 16 are connected. The piston 26 is held in this position by engagement of a portion of the ball 34 with the end 38 of the triggering lever 24. Normally both gravity and the water line pressure exerted by the water in the region 41 above the piston bias the piston downwardly but the holding means constituting the end portion 38 of the lever 24 serves to retain the piston in the position shown in Figure 2. In this position, the re-setting or cocking lever 22 is in the pivoted position shown wherein the signal light switch 21 is off.

Initially, the threaded screw 35 is adjusted to apply a pre-determined force against the ball 34 outwardly against the stop 37 and against the end 38 of the triggering lever 24. This pre-determined force is such that the piston 26 will be retained in the position illustrated in Figure 2 until a pre-determined water pressure is exerted on the top of the piston 26 sufficient to overcome the biasing force of the spring 36 and cause the ball 34 to be urged inwardly by the end 38 of the lever 24. When this occurs, the force exerted on the top of the piston by the water pressure in the region 41 will move the piston to the position illustrated in Figure 3.

In the position illustrated in Figure 3, it will be evident that the lateral ports connecting to the conduits 15 and 16 are both eclipsed by solid portions of the piston so that both the water and gas flow to the tank and heater, respectively, are shut off. The central annular sealing ring 31 in co-operation with the upper of the rings 30 seals off the port connecting to the conduit 16 so that any leakage of gas is prevented. Similarly, the upper of the pairs of sealing rings 29 seals off the port connecting to the water conduit 15 and confines the water pressure to the region 41 above the piston thus preventing any possible water leakage from the cylinder.

Movement of the piston 26 downwardly to the position shown in Figure 3 will result in a rotation of the cocking lever 22 in a counter clockwise direction about the pivot 40 as a result of the engagement of the cavity 32 with the end of the lever. This motion in turn raises the other end of the lever together with the connecting link 23 to throw the toggle switch 21 to an up position as shown in Figure 3 thereby lighting a signal light.

After the excessive water line pressure has been reduced to a normal value, the piston may then be re-set to the position illustrated in Figure 2 by simply depressing the cocking lever 22 thereby urging the piston upwardly as a result of rotation of the lever 22 about its pivot point 40 in a clockwise direction. This motion simultaneously throws the toggle switch 21 downwardly back to the position shown in Figure 2. When the ball 34 has been raised above the end of the triggering lever end 38 it will pop out against the stop 37 and the piston will then be retained in the position illustrated in Figure 2.

It will be evident from the foregoing, accordingly, that the valve functions in an automatic manner to close off both the water and gas conduits if the water line pressure exceeds a pre-determined value.

In the event of a leaking of water to the floor or a bursting of the water tank 13 to flood the area, the valve is also automatically actuated independently of the condition of the water pressure. This actuation is accomplished as a result of the presence of water about the sponge 45. Soaking of the sponge 45 by the water will result in its losing its supporting characteristics with the consequence that the weight of the right hand portion of the triggering lever 24 in conjunction with the spring 46 will depress the rod 18 to the position shown in Figure 3. This action in turn results in a clockwise movement of the triggering lever 24 about the pivot point 39 thereby disengaging the end 38 of the lever from the lower portion of the ball 34. Thus, the piston 26 is released by this action and will drop down to the position illustrated in Figure 3. In this position, the conduits 15 and 16 are shut off as described heretofore.

To re-set the mechanism after the flooded area has been cleaned up and the cause of the flooding corrected, the re-setting or cocking lever 22 is urged downwardly as before to rotate the same in a clockwise direction about the pivot point 40 and thus raise the piston 26. The signal light switch 21 is simultaneously turned off. The triggering lever 24 is then manually rotated until its end 38 engages under the ball 34. The lever is retained in this position by then inserting a fresh dry sponge under the actuating rod 18.

It will thus be seen that the presence of water on the floor will effect operation of the valve independently of any changes in the water pressure. It will also be evident from the previous description with respect to changes in the water pressure that triggering of the device as a consequence of excessive pressure effects closure of the conduits independently of whether or not water is present on the floor.

The present invention accordingly constitutes a greatly improved emergency shut-off valve. All of the various controls such as the signal light switch 21, the re-setting or cocking lever 22, the triggering lever 24, and access to the sponge housing 19 are arranged to project from the same face of the valve housing 17 so that the flush mounting as described can be easily achieved to provide a neat appearance and ready access to the controls.

While the invention has been described specifically with respect to emergency situations arising in connection with hot water heaters, it will be understood that the valve may be employed in other situations without departing from the scope and spirit of the invention, and that many modifications and changes may be made according to the particular application requirements.

Thus, the switch 21 could function as a relay to operate a breaker in the event the valve was employed with an electric hot water heater. In such an application, of course, the port 28 and line 16 would not be used.

Furthermore, it is apparent that the valve is equally adaptable to dishwashers and automatic washers. In such cases, the line 15 would communicate with cold water and the line 16 with hot water. In turn, the switch 21 would be placed in the main electrical line to the equipment or in the alternate function as a relay. The switch 21 would be used as a relay in cases where the appliance involved operates on 220 volts, assuming conventional light switch construction is employed.

It is evident that the above modifications will be apparent to one skilled in the art according to the scope of the appended claims.

What is claimed is:

1. A safety valve adapted to be interposed in a conduit for shutting off the flow of fluid through said conduit, comprising, in combination: a cylinder having transverse ports in its side walls for connection to said conduit; a piston in said cylinder having a transverse bore registering with said ports to pass said fluid when said piston is in a first position, movement of said piston to a second position eclipsing said ports to block flow of fluid; said piston being biased towards said second position; and holding means holding said piston in said first position, said holding means including an actuating material which is responsive to physical contact by said fluid to release said piston if said fluid escapes to make physical contact with said actuating material.

2. The subject matter of claim 1, in which said holding means is also responsive to a predetermined pressure of said fluid, whereby said piston is released if the pressure of said fluid exceeds said pre-determined pressure.

3. An emergency shut-off valve for simultaneously shutting off fluid flow in two fluid conduits in response to excessive fluid pressure and flooding, comprising, in combination: a valve housing defining an internal cylinder having lateral ports transversely passing through the walls of said housing to said cylinder, said fluid conduits connecting, respectively, to said ports; a piston in said cylinder having transverse bores, respectively, registering with said ports when said piston is in a first position so that fluid flows through said valve housing; holding means holding said piston in said first position, said holding means being responsive to excessive water pressure to release said piston; and responsive means, including an actuating material positioned to make physical contact with said water in the event of flooding and responsive to such physical contact by said water for releasing said piston whereby both excessive water pressure and flooding release said piston, said piston upon release moving to a second position in which said bores are out of registration with said ports so that fluid flow is cut off by said piston.

4. The subject matter of claim 3, in which said piston includes a side opening, said holding means comprising a ball partially protruding from said side opening, said cylinder having a stop juxtaposed a lower portion of said piston opening when said piston is in said first position to partially block said ball; a triggering lever pivoted intermediate its ends to said housing, one end of said lever terminating adjacent to said stop to engage a portion of said ball and prevent relative movement between said piston and cylinder; biasing means urging said ball against said stop; means for adjusting the force exerted by said biasing means whereby said ball is only retractable out of engagement with said stop and said one end of said triggering lever to release said piston in the absence of movement of said triggering lever when a pre-determined force is exerted on said piston sufficient to move said piston to said second position; and branch passage means connecting said water conduit to one end of said cylinder so that said piston is subject to the pressure of said water whereby when said pressure of said water exerts a force equal to said pre-determined force said piston is moved to said second position.

References Cited in the file of this patent

UNITED STATES PATENTS

| | | |
|---|---|---|
| 2,127,849 | Stone | Aug. 23, 1938 |
| 2,331,109 | Ganahl | Oct. 5, 1943 |
| 2,711,186 | Perez | June 21, 1955 |